March 2, 1965     W. D. HAENTJENS ETAL     3,171,635

JET FLOW AGITATOR

Filed Oct. 16, 1961     2 Sheets-Sheet 1

INVENTORS
WALTER D. HAENTJENS
RALPH J. LOFQUIST
BY
ATTORNEYS

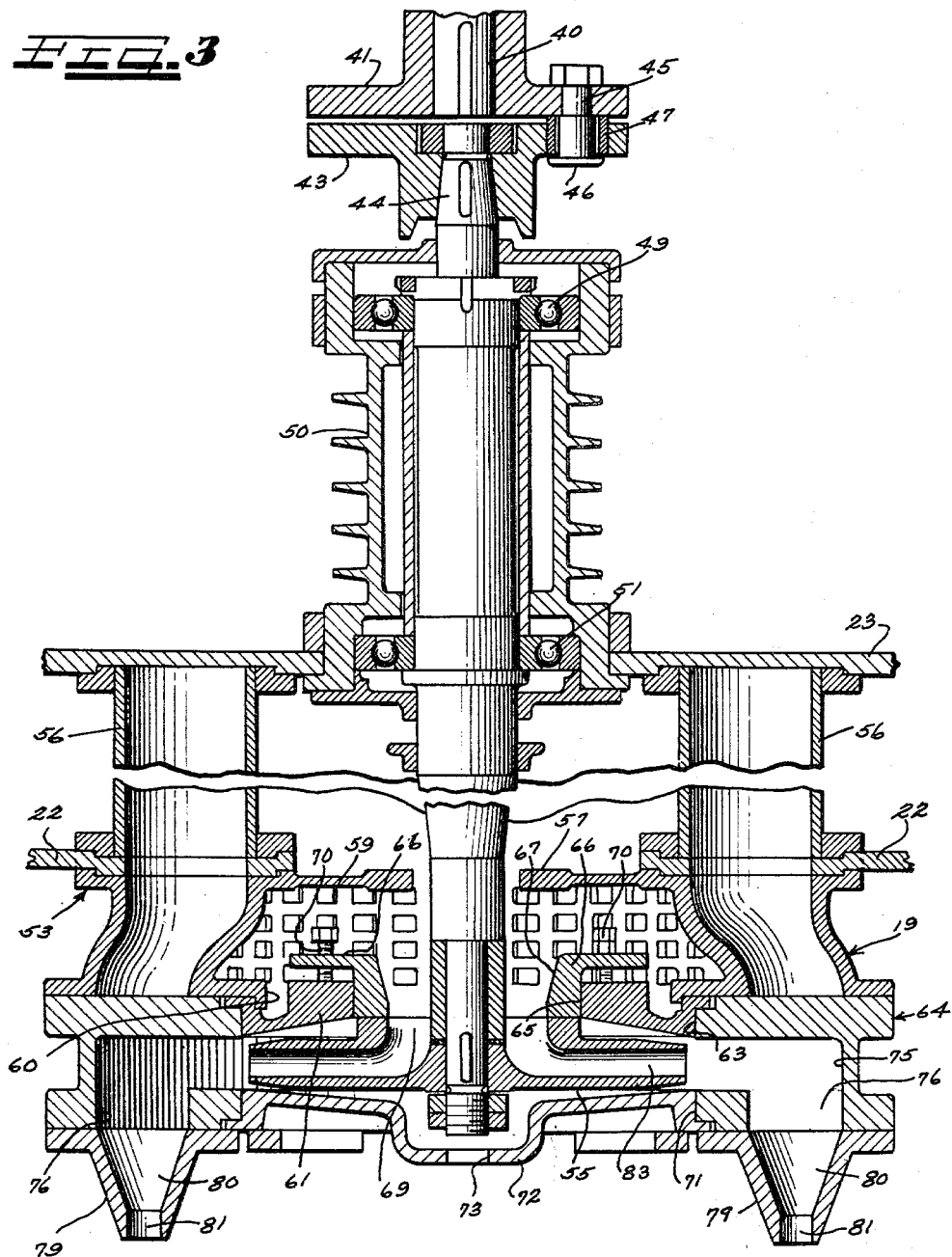

United States Patent Office 3,171,635
Patented Mar. 2, 1965

3,171,635
JET FLOW AGITATOR
Walter D. Haentjens, Sugarloaf, Pa., and Ralph J. Lofquist, Chicago, Ill., assignors to Barrett-Haentjens & Company, Hazleton, Pa., a corporation of Pennsylvania
Filed Oct. 16, 1961, Ser. No. 145,234
3 Claims. (Cl. 259—4)

This invention relates to an improved form of agitator operating on the jet flow principle, for placing settled heavy solids in suspension.

In the mixing of chemicals and particularly fluorides with water for water treatment, the fluorides are maintained in the form of a slurry by an agitator which must be kept in continuous operation to prevent the fluorides from settling to the bottom of the tank, which may occur upon a power failure, frequently making it necessary to drain the tank or resuspend the solids with an air lance.

While various forms of agitators have heretofore been used to maintain a slurry, and while jets of water have been injected into the bottom of tanks for the purpose of agitating liquid in the tanks, the mere agitation of the solution in a tank is insufficient to put a settled heavy media in solution. Where pumps and the like have been used to eject water to the tank, the pumps frequently become clogged with the chemical, requiring frequent cleaning of the pump and repair of the parts damaged by the clogging.

A principal object of the present invention is to remedy these difficulties by agitating settled solids in water to place the solids in suspension, by taking water from a clear water level in the tank and ejecting this water into the settled solids in the bottom of the tank, to suspend the solids in the water in the form of a slurry.

Another object of the invention is to provide a simple and improved form of agitator for bringing tightly packed solids into suspension, so arranged as to initially take water from a clear water level in a tank and inject this water into the solids in the bottom of the tank in the form of jets to suspend the solids in the tank and create a slurry, and then recirculate the suspended solids.

A still further object of the invention is to provide an improved form of jet flow agitator for suspending settled solids in which jets of liquid are injected downwardly into the solids by the operation of an impeller, and in which the inlet for the ejected liquid is above the impeller and initially in the clear water level of the tank, during the operation of suspending the settled solids.

These and other objects of the invention will appear from time to time as the following specification proceeds and with reference to the accompanying drawings wherein:

FIGURE 3 is a fragmentary vertical sectional view taken through the agitator shown in FIGURE 1.

Figure 1:
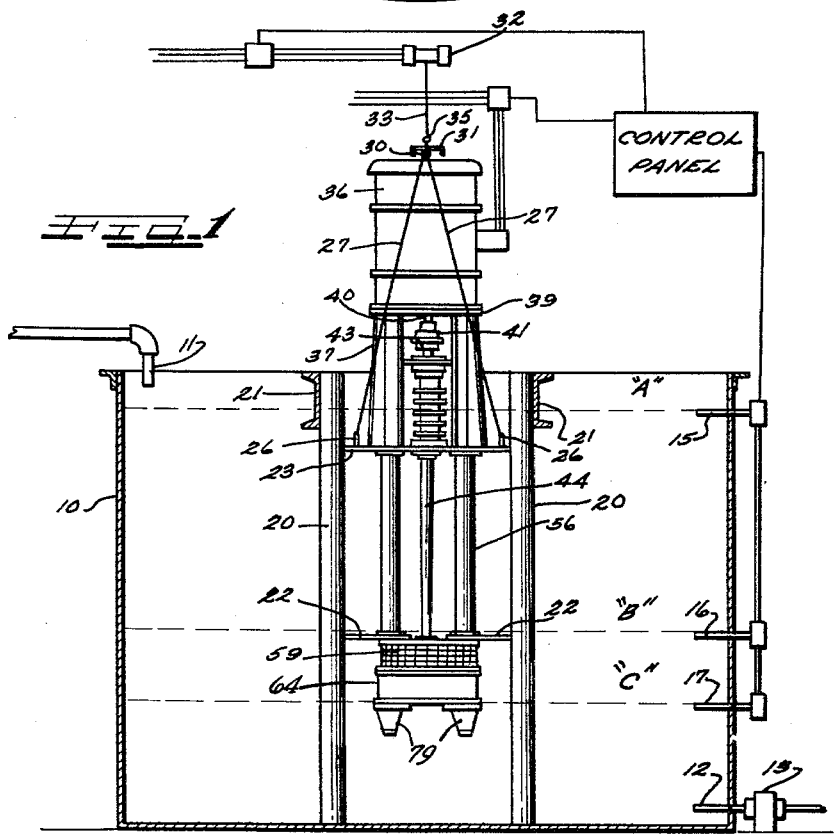
FIGURE 1 is a diagrammatic view showing a tank in section with the jet flow agitator of the invention in the tank, for suspending settled solids in the tank, and diagrammatically illustrating the control circuit for maintaining the agitator at the proper level in the tank in accordance with the level of the solution in the tank.

In the embodiment of the invention illustrated in the drawings, we have shown in FIGURE 1 a slurry tank 10 which may contain a solution of sodium fluoride to be used for the fluoridation of water in city water systems. It should be understood, however, that our invention should not be construed as limited to a fluoridation tank, but is adapted to putting into solution various types of solids, which tend to settle out of solution.

An inlet pipe 11 leading from a suitable storage tank (not shown) leads into the tank 10 from the top thereof while an outlet 12 leads from a wall of the tank adjacent the bottom thereof. The outlet 12 is connected with a metering pump 13 for metering the solution for mixture with city water, in a suitable manner.

We have also shown three electrodes 15, 16 and 17 in the tank 10 at levels "A," "B" and "C," for controlling the level of an agitator 19 in accordance with the level of solution within the tank. The electrodes 15, 16 and 17 may be Hazleton electrodes, such as are illustrated on pages 2 and 3 of the Barrett-Haentjens & Co., Bulletin No. 902, and are well known to those skilled in the art so need not herein be shown or described further.

The tank 10 also has spaced diagonally opposed upright posts 20 projecting upwardly from the bottom of the tank and forming guides for the agitator 19.

Figure 2:
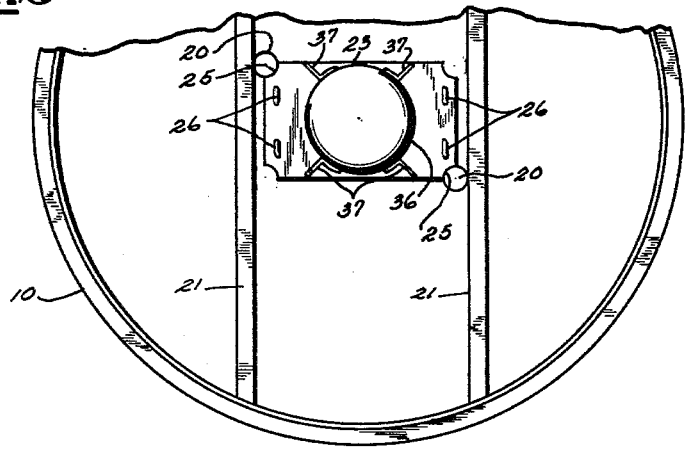
FIGURE 2 is a fragmentary generally diagrammatic plan view of the tank and agitator shown in FIGURE 1 looking at the tank and agitator from the top thereof.

The posts 20 may be in the form of heavy duty pipes and are shown in FIGURES 1 and 2 as being welded or otherwise secured to the webs of cross-channels 21 extending across the tank 10 in parallel relation with respect to each other, and welded or otherwise secured to the wall of said tank at their ends. As shown in FIGURE 1, guide plates 22 project outwardly from the upper end portion of the agitator 19 and are guided for vertical movement along said posts. A vertically spaced motor support plate 23 is also guided for vertical movement along said post. The motor support plate 23 has recessed portions 25 at its corners conforming to the forms of the posts 20 and guided for movement therealong. The guide plates 22 have similar recessed portions (not shown).

The motor support plate 23 is shown as having two eye bolts 26 at each end thereof, having cables 27 connected thereto and connected at their upper ends to a ring 30 of a hitch 31. The hitch 31 is shown as being connected to a hoist 32 by a cable 33 hooked through a ring 35 of said hitch. The hoist 32 may be a motor driven hoist of a type in which the motor casing and hoist casing are integral. The hoist 32 may be suspended from a suitable beam or from the ceiling in a manner well known to those skilled in the art, so not herein shown or described in detail.

A motor 36 for driving the jet flow agitator 19 is mounted in vertically spaced relation with respect to the motor support plate 23 on four legs 37 welded or otherwise secured to the motor support plate 23 at their lower ends and extending upwardly and angularly inwardly to an end plate 39, and welded or otherwise secured to said end plate at their upper ends.

The motor 36 has a vertical motor shaft 40 depending therefrom. The motor shaft 40 has a flanged coupling member 41 keyed or otherwise secured to its lower end portion and having driving connection with a flanged coupling member 43 keyed or otherwise secured to the upper end of an agitator shaft 44. The drive between the coupling members 41 and 43 is shown as comprising a stepped bolt 45 having a head 46 on its lower end and extending through a bushing or liner 47 extending through the flange of the flanged coupling 43.

The shaft 44 is journalled adjacent its upper end in an anti-friction bearing 49 suitably mounted in the upper end portion of a bearing housing 50, and is journalled intermediate its ends in an anti-friction bearing 51 mounted in the lower end portion of the bearing housing 50 in general horizontal alignment with the motor support plate 23. The shaft 44 depends from the motor support plate 23 and extends within a casing 53 for the agitator 19 and has an impeller 55 keyed or otherwise secured to its lower end. The casing 53 is spaced downwardly from the motor support plate 23 and is supported thereon in depending relation with respect to said motor support plate, beneath the guide plates 22, by a plurality of pipes 56, forming suspension columns suspending the casing 53 from the guide plate 23.

The casing 53 includes an inlet part 57, suitably secured to the columns 56 beneath the guide plates 22 and having screen plates 59 extending thereabout. The inlet part 57 is generally annular in form and has a lower generally circular opening 60 having an annular plate 61 extending inwardly therefrom and forming a closure for an upper open portion 63 of an impeller casing 64. The plate 61 has a central open portion 65 having a gland ring 66 fitting therein, having an inverted frusto-conical wall portion 67 registering with an inlet passageway 69 in the impeller 55, and forming an inlet for said impeller. The position of the gland ring 66 with respect to the upper face of the impeller may be adjusted and maintained in adjustment by machine screws and lock nuts 70, threaded through the gland ring 67 and abutting the upper face of the plate 61.

The plate 61 thus forms a closure for the upper end portion of the impeller casing 64 admitting liquid through the frusto-conical wall portion 67 of the gland ring 66 into the inlet portion 69 of the impeller 55. An open bottom portion 71 of the impeller casing 64 is closed by a cover plate 72. The cover plate 72 has a central drain opening 73 therein, accommodating liquid to drain from the casing 64 as the impeller is lifted above the level of water in the tank 10. Centrifugal force created by the impeller prevents any substantial loss of liquid through the drain opening 73, when the pump is operating.

The inner periphery of the impeller casing 64 is in the form of volutes 75 having equally spaced discharge outlets 76 and thereby balancing the side thrusts. The outlets 76 open through the bottom of the impeller casing 64 and form downward continuations of the volutes 75 (FIGURE 3).

Nozzles 79 have communication with the outlets 76 and depend from the bottom of the casing 64 and are suitably secured thereto. As shown in FIGURE 3, the nozzles 79 have inverted frusto-conical wall portions 80 converging from the outlets 76 and terminating into cylindrical wall portions 81 opening to the bottoms of said nozzles for ejecting jets of water therethrough.

The impeller 55 also has a plurality of radial passageways 83 leading outwardly therealong and opening to the periphery of said impeller and having communication with the inlet passageway 69 of said impeller and thereby ejecting the water from the ends of said passageways into engagement with the wall 75 for discharge through the outlets 76 and nozzles 80, with a jet like action.

In carrying out the invention, the agitator 19 is initially supported with the guide plate 22 at level "A" in the tank 10. As the fluoride or other solution is supplied to the tank and reaches level "A," the electrode 15 will effect the starting of the agitator drive motor 36 to rotate the impeller 55. When the solution reaches the "B" level the hoist will be started and gradually lower the agitator 19 in the tank 10 until the guide plates 22 are at level B. The agitator will then continue in operation, drawing the solution through the screen 59 and inlet 69 into the impeller and discharging jets of water downwardly through the nozzles 19 to maintain a slurry in the tank 10.

If the level of the solution should drop to level C, the electrode 17 will effect the stopping of the motor 36 and wall effect operation of the hoist 32 to raise the agitator in the tank 10 until the guide plate 23 is at level "A."

As the level of the solution drops to level "C" and the agitator is raised until the guide plates 22 are at level "A" and stopped, and the level of solution is raised to level "A," the agitator may be started at level "A" to maintain the inlet in clear water at level "A," out of which the solids have settled. The agitator should remain at this level until the solution reaches level "B" and then be lowered until the guide plates 22 are at level "B."

The inlet to the agitator is thus in the clear water level in the tank 10 when putting the solids in suspension and is raised out of the solution when the level of the solution drops to a predetermined low level, as for example, level "C." The starting and stopping of the agitator as well as the raising and lowering of the agitator and the maintaining of the agitator in position is dependent upon the level of the solution in the treating tank.

Should the motor 36 be stopped for some reason while the agitator guide plates 22 are at level "B," and the level of the solution rises to level "A," the hoist 32 will raise the agitator till the guide plates 22 are at level "A." The motor 36 will then be restarted under the control of the electrode 15. The agitator should remain with the guide plates 22 at level A for a short period of time, which may be in the nature of five minutes, to resuspend the settled solids in the bottom of the tank. The agitator may then be relowered to position the guide plates at level "B."

It may be seen from the foregoing that the agitator of the invention may effectively suspend solids in the bottom of a tank, which have settled due to stopping of the agitator as by a power failure. The agitator also not only effectively places settled fluorides in suspension, but agitates and maintains fluoride slurries, and is effective for placing sand, magnetite, ferrosilicone and other heavy media in solution, as well as for agitating hot lime slurries and preventing crusting deposits of the lime.

While we have herein shown and described one form in which our invention may be embodied, it should be understood that various modifications of the invention may be attained without departing from the spirit and scope of the novel concepts thereof as defined by the claims appended hereto.

We claim as our invention:

1. In an agitator particularly adapted to place settled solids in suspension and in combination with a tank, a casing within said tank having an impeller mounted therein for rotation about a vertical axis, a motor supported on said casing, a shaft driven by said motor and coaxial with said impeller for rotatably driving said impeller, an inlet leading into said casing from a region above said impeller, a plurality of outlets leading downwardly from said casing in radial outwardly spaced relation with respect to said impeller, downwardly directed nozzles leading from said outlets, means guiding said casing for vertical movement with respect to the bottom of said tank, a motor driven hoist for raising and lowering said casing with respect to the bottom of said tank in accordance with the level of solution in said tank, and control means for said motor driven hoist and said motor including an electrode adjacent the bottom of said tank operative to stop said impeller and effect raising of said casing upon the lowering of the level of the solution in said tank to a predetermined low level sensed by said electrode.

2. In an agitator particularly adapted to place settled solids in suspension and in combination with a tank having a solution inlet leading thereinto from the top thereof and a solution metering outlet leading from the bottom of said tank, a casing having an impeller rotatably mounted therein for rotation about a vertical axis and having an inlet thereinto spaced above said impeller and having fluid communication therewith, means for guiding said casing for vertical movement along said tank toward and from the bottom thereof, a motor driven hoist control means within said tank for said motor driven hoist, operating said hoist to vertically move said casing along said guide means in accordance with the level of solution within said tank, a plurality of outlets leading from the bottom of said casing in radial outwardly spaced relation with respect to said impeller, and downwardly directed nozzles leading from said outlets for directing jets of liquid downwardly into the solids in the bottom of said tank.

3. In an agitator particularly adapted to place settled solids in suspension and in combination with a tank having a solution inlet leading thereinto from the top thereof and a solution metering outlet leading from the bottom of said tank, a casing, an impeller mounted within said casing for rotation about a vertical axis, a motor spaced above said casing, means for supporting said motor on said casing in vertically spaced relation with respect thereto, a drive connection from said motor to said impeller, said impeller having an annular inlet leading thereinto from the top thereof and radial discharge passageways in association with said inlet, for discharging liquid to the wall of said casing, a plurality of outlets leading downwardly from said casing in outwardly spaced relation with respect to said impeller, downwardly directed nozzles leading from said outlets, directing jets of liquid downwardly toward the bottom of said tank, a pair of parallel spaced guide means for guiding said motor and casing for vertical movement along said tank, and control means effective in accordance with the level of solution in said tank for effecting the starting of said motor and agitator at a high level of solution in said tank and the lowering of said agitator to an intermediate level of solution in said tank and maintaining said agitator at said level, and stopping said agitator and effecting raising thereof at a low level of solution in said tank.

References Cited in the file of this patent

UNITED STATES PATENTS

| | | |
|---|---|---|
| 2,078,065 | DeBethune | Apr. 20, 1937 |
| 2,668,694 | Kline et al. | Feb. 19, 1954 |
| 2,812,928 | Mesh et al. | Nov. 12, 1957 |
| 2,890,659 | Haentjens et al. | June 16, 1959 |
| 2,997,373 | Stephens | Aug. 22, 1961 |

FOREIGN PATENTS

| | | |
|---|---|---|
| 1,098,383 | France | Mar. 2, 1955 |